Oct. 5, 1965

P. V. L. SALMINEN 3,209,934

BOTTLE CLOSURE

Filed May 6, 1964

INVENTOR.
Paavo Viktor Ludwig Salminen
BY
Michael S. Striker

United States Patent Office
3,209,934
Patented Oct. 5, 1965

3,209,934
BOTTLE CLOSURE
Paavo Viktor Ludvig Salminen, Helsinki, Finland, assignor to Etablissement Pasinvest, Geneva, Switzerland, a corporation of Liechtenstein
Filed May 6, 1964, Ser. No. 365,444
Claims priority, application Sweden, May 6, 1963
4,966/63
5 Claims. (Cl. 215—41)

This invention relates to bottle closures in one piece of thermoplastic material having a grip portion which in the closing position extends over the outside of the bottle neck, and a tubular stopper portion extending into the bottle neck, said tubular stopper portion having an outer peripheral sealing bead at a distance from its upper end and a closure portion joined to the tubular stopper portion near its lower end and having an upwardly extending frusto-conical wall and an upper cover portion, the tubular stopper portion being above the sealing bead provided with a thin, flexible wall portion. Bottle closures of this type have been previously suggested by the inventor, which were provided with a thick annular reinforcement around the upper end of the stopper portion, an annular reinforcement inside the lower end of the stopper portion and thinner flexible wall portions between the respective ends of the stopper portion and said annular reinforcements.

Such bottle closures have been manufactured of soft polyethylene and have shown very good sealing porperties during long periods of time under normal temperature in temperate climate conditions. These closures have, however, been found to have lower quality as to sealing properties and permanency in such climates where the temperature more than occasionally rises above 40° C. This depends on the fact that at higher temperatures the pressure in the bottle increases and the stiffness of the thermoplastic material is markedly reduced. It is therefore not sufficient to augment the thickness of the material to obtain a higher stiffness, which can resist the augmented inner pressure. On the contrary, measures must be taken to obtain a compensation for the lower stiffness of the material at higher temperatures.

If for this purpose it is desired to use a thermoplastic material which has a higher softening temperature, it will be necessary to search for materials with remarkably higher stiffness and hardness at lower temperatures than those materials which according to the previous suggestion mentioned above are appropriate for more temperate climates, and to choose, for instance, high density polyethylene or polypropylene.

The higher stiffness of the materials which are appropriate for tropic conditions, might in certain parts of the closure be compensated by making these parts thinner. This is however not sufficient for obtaining a closure which under tropic conditions shows as good properties as the prevously suggested closures in temperate climates, that is, good sealing properties, which are dependent not only on the elastic flexibility of the material but also on its local elastic compressibility in certain parts. A higher stiffness of the thermoplastic material can therefore not simply be compensated by making the walls of the closure thinner, because the elastic compressibility is not compensated thereby.

This invention is based on the principle that the necessary adaptability of the sealing surface of the closure to existing variations in shape and dimensions in the bottle necks is obtained by a changed repartition between elastic flexibility and elastic compressibility. In the shaping of the bottle closure regard must be taken to the changes in the stresses due to changed materials, which arise under the pressure exerted onto the top surface of the closure when pressing it onto the bottle neck.

According to the invention the reduced compressibility of the sealing bead is compensated thereby that the elastic flexibility inwards of the lower end of the tubular stopper portion is augmented, that the lower annular reinforcement and the conical side walls of the closure portions are made thinner than what corresponds to the augmented stiffness due to the change of materials, and that simultaneously this diminution of the stiffness is limited to only one necessary direction but is compensated in another direction by reinforcing ribs.

Based on this principle, the invention is characterised in that the conical wall of the closure portion is joined to the tubular stopper portion by means of a flexible connection wall and that the axial reinforcing ribs are prolongated from the lower end of the stopper portion in over said connection wall and up along the conical wall of the closure portion.

Further details and characteristics of the invention will be found in the following description of an embodiment of a bottle closure according to the invention.

Figure 1:
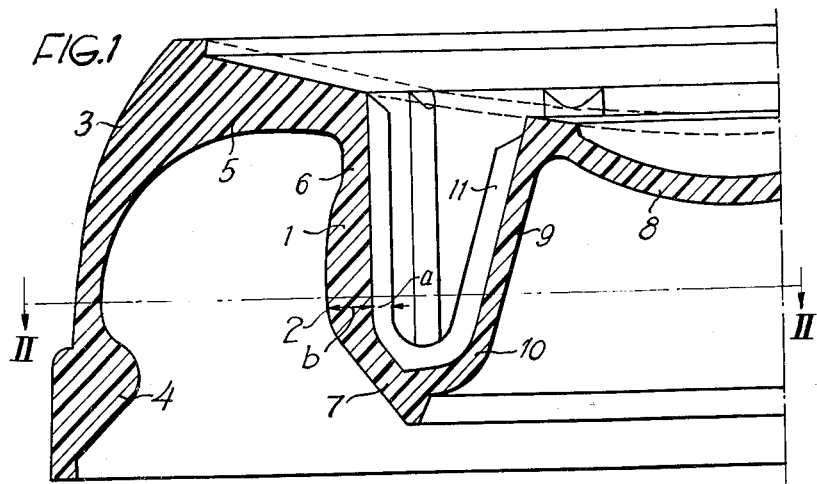
FIG. 1 is a half axial section at an enlarged scale through a closure according to the invention, taken along line I—I in FIG. 2.

In the drawing the bottle closure comprises a tubular stopper portion 1 to be inserted into the bottle neck and having an outward annular sealing projection or bead 2. The upper end of the tubular stopper portion 1 is connected to an outwardly and downwardly extending grip portion 3 adapted to suuround the outside of the bottle mouth and to engage the underside of the annular projection on the bottle neck with an inner annular projection 4. The upper part of the grip portion 3 has a thickened portion forming an annular reinforcement serving as a support for the upper end of the tubular stopper portion 1. Between this annular reinforcement 5 and the sealing bead 2 the stopper portion has a thinner flexible wall portion 6. The lower end of the stopper portion has a conical, downwardly converging guide surface 7 provided for facilitating the insertion of the stopper portion into the bottle mouth. A closure portion provided for closing the lower end of the tubular stopper portion 1 consists of a central cover portion 8 and a conical, downwardly diverging wall 9, the lower end of which is connected to the lower end of the stopper portion by a connecting wall portion 10 forming a smoothly arched transistion between the conical wall and its radially extending border. The stopper portion 1 is on its inside provided with axial reinforcing ribs 11 which extend from the upper end of the stopper portion or from a point near this upper border down to the lower end of the stopper portion and from there inwardly along the connecting wall portion 10 between the stopper portion and the cover portion wall 9 and upwards along the outside of this conical wall 9. It is of very great importance as well from the standpoint of the moulding technique as with regard to the correct function of the closure that these reinforcing ribs 11 are correctly formed.

Because of the low elastic compressibility of the relatively hard material used it is necessary with regard to the adaptability to existing large variations of the bottle neck dimensions that the stopper portion has an elastic flexibility in the peripheric direction to compensate for the reduced elastic compressibility. This increased elastic flexibility must, however, not exist in the axial direction of the stopper portion 1, because this would collapse like a bellows when the stopper portion is pressed into the bottle neck. The necessary stiffness against collapsing is obtained by means of the reinforcing ribs 11. The large flexibility in the lower end of the stopper portion serving to permit the adaptation of the sealing bead 2 to the bottle neck is obtained by forming the wall 9 of the closure portion and the connecting wall portion 10 thinner than corresponds to the increased stiffness of the material. The necessary stiffness of these parts in the axial direction which permits also the exertion of the inserting pressure onto the upper end of the conical wall 9 of the closure portion, is obtained by the prolongation of the reinforcing ribs along these parts.

Because of the higher stiffness of the material it is especially important in a bottle closure according to the invention to obtain the most perfectly circular form possible of the outer surface of the sealing bead 2. In the moulding of objects of thermoplastic material with irregular wall thickness recesses are very easily and automatically formed in the material opposite the thickened portions. Definite prescriptions for the relation between the height of the reinforcing ribs 11 and the total thickness of the stopper portion 1 and the sealing bead 2 must therefore be given to prevent moulding recesses to be formed on the outer surface of the bead 2. It has been found that this is the case when the height $a$ of the reinforcing ribs 11 (FIG. 1) is at most equal to half the total thickness $b$ of the stopper portion 1 and the sealing bead 2.

Figure 2:
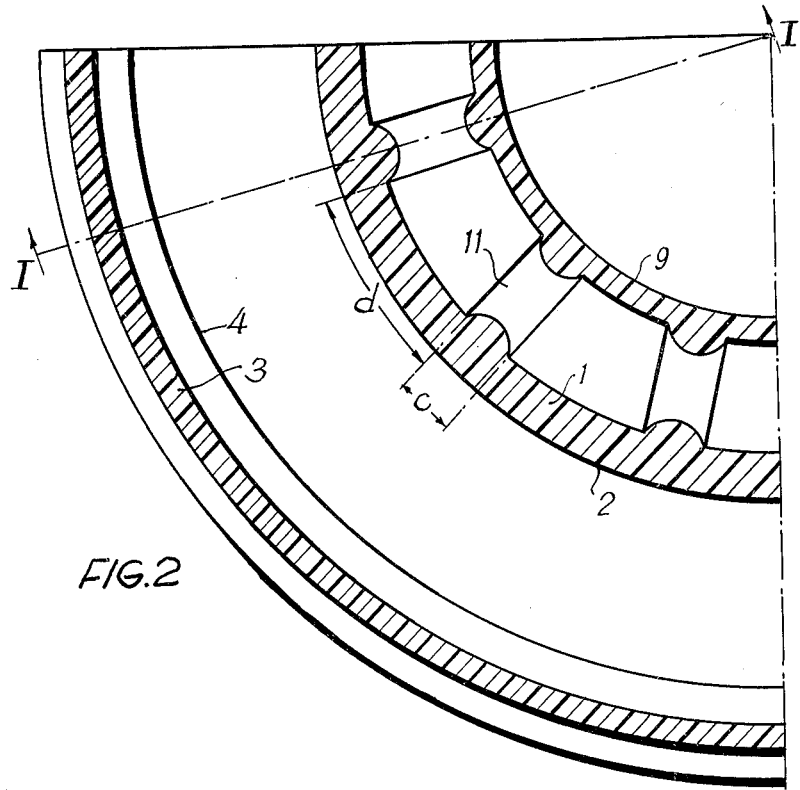
FIG. 2 is a section along line II—II in FIG. 1.

At the strong radial compression of the stopper portion 1, when this is inserted into the bottle neck, there is a tendency of the thin wall portions of the stopper portion to fold inwards. It must be taken into consideration concerning the dimension of the radial compression of the stopper portion that with regard to the necessary sealing pressure against the bottle neck wall and with regard to the variations of the diameter of the bottles a sealing bead with an outer diameter of e.g. 17.5 mm. must be able to be pressed into a bottle neck with an inner diameter of 14.8 mm. This corresponds to a restriction of the stopper portion in the circumferential direction of the order of 9 mm. It is therefore very important that the reinforcing ribs, which for the reasons indicated above must have a limited height, are disposed with such a width and with such spaces between them that they give the wall of the stopper portion a sufficient support against folding inwards without reducing unnecessarily the flexibility thereof necessary for the absorption of the radial compression. It has been found that a relation of 3:10 between the width $c$ of the reinforcing ribs 11 (FIG. 2) and the peripheral space $d$ between adjacent reinforcing ribs gives the desired results.

It is important that the transition portion 10 between the conical wall 9 of the closure portion and the lower end of the stopper portion 1 is softly arched. A sharp angular bend between the conical wall 9 and the radial joining portion would cause local concentration of material where the reinforcing ribs, equally forming a sharp angular bend, would cross this transition. Further, a sharp angular bend would form an obstacle to a quick and smooth passage of the thermo-plastic material during the moulding operation, which is performed preferably from an inlet in the mould at the center of the cover portion 8. Such materials are generally injected under very high pressure, so that they flow with extremely high speed, e.g. 400 m./s. from the inlet to the most remote outer border of the bottle closure. In order to obtain a uniform quality of the material it is extremely important that the material can flow as rapidly and as freely as possible to the farthest parts of the mould. The relatively thin side walls 9 of the closure portion in combination with sharp bends between these and the lower part of the stopper portion 1 would tend to hamper such a free flow of material. The prolongation of the reinforcing ribs 11 over the transition portion 10 and along the side walls 9 of the closure portion together with the smooth rounding of this transition portion 10 cooperate in facilitating the rapid and complete filling of the mould with thermoplastic material besides their effect to compensate for the reduced stiffness in axial direction due to the reduced thickness of the walls.

What I claim is:

1. A bottle closure in one piece of thermo-plastic material comprising a grip portion adapted to extend outwards over the top of the bottle mouth and downwards over the outside of the bottle neck, a tubular stopper portion provided for insertion into the bottle neck and having an outer peripheral sealing bead at a distance below its upper end, a thinner flexible wall portion between said sealing bead and the upper end connected to the grip portion and axial reinforcing ribs on its inside, a closure portion extending from the lower portion of the tubular stopper portion inwards and upwards in the form of a frusto-conical wall closed at its upper end by a flat cover portion, said frusto-conical wall of the closure portion being connected to the stopper portion by an arched connecting wall portion having a concave upper side, the axial reinforcing ribs on the inside of the stopper portion extending from the lower end of said stopper portion inwards along said concave upper side of the arched connecting wall portion and upwards along at least a part of the conical wall of the closure portion so that said ribs resemble U-shaped members, those portions of said ribs which extend along said concave upper side flexing in response to insertion of said stopper portion into the neck of a bottle.

2. A bottle closure in one piece of thermo-plastic material comprising a grip portion adapted to extend outwards over the top of the bottle mouth and downwards over the outside of the bottle neck, a tubular stopper portion provided for insertion into the bottle neck and having an outer peripheral sealing bead at a distance below its upper end, a thinner flexible wall portion between said sealing bead and the upper end connected to the grip portion and axail reinforcing ribs on its inside, a closure portion extending from the lower portion of the tubular stopper portion inwards and upwards in the form of a frusto-conical wall closed at its upper end by a flat cover portion, said frusto-conical wall of the closure portion being connected to the stopper portion by a connecting wall portion having in axial section the shape of a bend forming a smooth transition between the conical wall and the lower end of the stopper portion, said connecting wall portion having a concave upper side, the axial reinforcing ribs on the inside of the stopper portion extending from said stopper portion inwards along said concave upper side of the connecting wall portion and upwards along at least a part of the frusto-conical wall with uniform height throughout the length of the reinforcing ribs so that said ribs resemble U-shaped members, those portions of said ribs which extend along said concave upper side flexing in response to insertion of said stopper portion into the neck of a bottle.

3. A bottle closure in one piece of thermo-plastic material comprising a grip portion adapted to extend outwards over the top of the bottle mouth and downwards over the outside of the bottle neck, a tubular stopper portion provided for insertion into the bottle neck and having an outer peripheral sealing bead at a distance from its upper end, a thinner flexible wall portion between said sealing bead and the upper end connected to the grip portion and axial reinforcing ribs on its inside, a closure portion extending from the lower portion of the tubular stopper portion inwards and upwards in the form of a frusto-conical wall closed at its upper end by a flat cover portion, said frusto-conical wall of the closure portion being connected to the stopper portion by an arched connecting wall portion having in axail section the shape of a bend forming a smooth and flexible transition between the lowermost end of the frusto-conical wall and the lower end of the stopper portion, said connecting wall portion having a concave upper side, the axial reinforcing ribs on the inside of the stopper portion extending with uniform height along their entire length from said stopper portion inwards along said concave upper side of the arched connecting wall portion and upwards along at least a part of the conical wall of the closure portion so that said ribs resemble U-shaped members, said uniform height of the axail reinforcing ribs and their extensions being at most half the maximum total thickness of the wall of the tubular stopper portion and the sealing bead, those portions of said ribs which extend along said concave upper side flexing in response to insertion of said stopper portion into the neck of a bottle.

4. A bottle closure in one piece of thermo-plastic material comprising a grip portion adapted to extend outwards over the top of the bottle mouth and downwards over the outside of the bottle neck, a tubular stopper portion provided for insertion into the bottle neck and having an outer peripheral sealing bead at a distance from its upper end, a thinner flexible wall portion between said sealing bead and the upper end connected to the grip portion and axial reinforcing ribs on its inside, a closure portion extending from the lower portion of the tubular stopper portion inwards and upwards in the form of a frusto-conical wall closed at its upper end by a flat cover portion, said frusto-conical wall of the closure portion is connected to the stopper portion by a connecting wall portion having in axial section the shape of a bend forming a smooth and flexible transition between the lowermost end of the frusto-conical wall and the lower end of the stopper portion, said connecting wall portion having a concave upper side, the axial reinforcing ribs on the inside extending from the upper part of the tubular stopper portion along its inside downwards and inwards over said concave upper side of the connecting wall and upwards along at least a part of the frusto-conical wall of the closure portion so that said ribs resemble U-shaped members, said ribs having throughout their length a substantially uniform height at most equal to half the total thickness of the wall of the tubular stopper portion and the sealing bead and a width of between 0.25 and 0.35 of the space between adjacent reinforcing ribs on the inside of the tubular stopper portion, those portions of said ribs which extend along said concave upper side flexing in response to insertion of said stopper portion into the neck of a bottle.

5. A bottle closure as set forth in claim 4, wherein the maximum thickness of said wall of the tubular stopper portion exceeds at least slightly the thickness of at least a portion of said connecting wall.

References Cited by the Examiner

UNITED STATES PATENTS 3,080,993   3/63   Livingstone _____ 215—41

FOREIGN PATENTS 865,039   4/61   Great Britain.

FRANKLIN T. GARRETT, *Primary Examiner.*